(12) United States Patent
Simons

(10) Patent No.: US 8,955,393 B2
(45) Date of Patent: Feb. 17, 2015

(54) LOAD-CELL SYSTEM

(75) Inventor: Gerald Sidney Simons, North York (CA)

(73) Assignee: Weigh Point Incorporated, Cambridge, Ontario (CA)

( * ) Notice: Subject to any disclaimer, the term of this patent is extended or adjusted under 35 U.S.C. 154(b) by 957 days.

(21) Appl. No.: 12/993,160

(22) PCT Filed: May 28, 2009

(86) PCT No.: PCT/CA2009/000723
§ 371 (c)(1),
(2), (4) Date: Nov. 17, 2010

(87) PCT Pub. No.: WO2009/143613
PCT Pub. Date: Dec. 3, 2009

(65) Prior Publication Data
US 2011/0067502 A1    Mar. 24, 2011

Related U.S. Application Data

(60) Provisional application No. 61/130,177, filed on May 29, 2008.

(51) Int. Cl.
| | |
|---|---|
| *G01L 1/22* | (2006.01) |
| *B66F 17/00* | (2006.01) |
| *G01G 3/14* | (2006.01) |
| *G01G 19/08* | (2006.01) |

(52) U.S. Cl.
CPC ............. *G01L 1/2231* (2013.01); *B66F 17/003* (2013.01); *G01G 3/141* (2013.01); *G01G 19/083* (2013.01)
USPC ...................................................... 73/862.045

(58) Field of Classification Search
USPC ............................... 73/862.041–862.046, 777
See application file for complete search history.

(56) References Cited

U.S. PATENT DOCUMENTS

| | | | | |
|---|---|---|---|---|
| 4,545,262 A | * | 10/1985 | Hellwig | 73/862.635 |
| 5,969,268 A | * | 10/1999 | Sommerfeld et al. | 73/862.041 |
| 6,730,861 B1 | * | 5/2004 | Simons | 177/136 |
| 7,284,444 B2 | * | 10/2007 | Kurtz et al. | 73/777 |
| 7,444,879 B2 | * | 11/2008 | Kurtz et al. | 73/777 |
| 7,659,484 B2 | * | 2/2010 | Kroll | 177/130 |
| 7,669,486 B2 | * | 3/2010 | Simons | 73/862.636 |
| 2007/0151357 A1 | | 7/2007 | Kurtz et al. | |
| 2008/0041638 A1 | * | 2/2008 | Simons | 177/210 FP |

\* cited by examiner

*Primary Examiner* — Lisa Caputo
*Assistant Examiner* — Octavia Hollington
(74) *Attorney, Agent, or Firm* — Anthony Asquith Corp.

(57) ABSTRACT

For adding a retro-fit load-measuring system to a walkie-type pallet truck etc, the low-profile load cell is formed with a chunky inner-boss and outer-ring. A thin annular disc, to which strain-gauges are cemented, extends between the two. The load-cell is installed in a fork of the truck, the outer-ring engaging a hole in the fork. The fork-cover engages the inner-boss of the load-cell, and is attached thereto with some free play.

17 Claims, 4 Drawing Sheets

LOAD-CELL SYSTEM

This invention relates to a load cell system, of the kind used to indicate the weight of a load resting on the forks or other load-platform of a pallet truck, fork lift, walkie, or the like. The system is especially applicable in the case of an add-on load-cell weight-measurement system, i.e a system that can be added to the truck as a post-purchase installation.

GENERAL FEATURES OF THE INVENTION

The load-cell described herein, for signalling the magnitude of a force, includes the following features.

The load-cell includes a saucer, having a chunky outer-ring, and a thin disc, which extends radially inwards from the outer-ring. When an axial load is applied to the disc, the load-cell being supported at its outer-ring, the disc deflects in a conical deflection mode. The outer-ring projects axially, beyond the undersurface of the disc, whereby the saucer includes an annular recess under the disc, inside the outer-ring, termed the gauge-recess.

The load-cell includes a plurality of strain-gauges, which are located on the undersurface of the disc, and within the gauge-recess. The strain-gauges are secured to the undersurface of the disc in such manner as to sense strains induced in the disc due to conical deflection of the disc.

The load-cell includes conductors, for conducting signals indicating the sensed strains to a receiver.

Preferably, the load-cell includes also a chunky inner-boss, and the thin disc extends between the chunky outer-ring and the chunky inner-boss.

Also described herein is an installation kit, which can be supplied as a convenient aid when retro-fitting a load-cell system to e.g a pallet-truck. Also described is a procedure for instaling a load-cell system on e.g a pallet-truck.

DETAILED DESCRIPTION OF PREFERRED EMBODIMENT

The technology will now be described with reference to the accompanying drawings, in which:—

Figure 1:
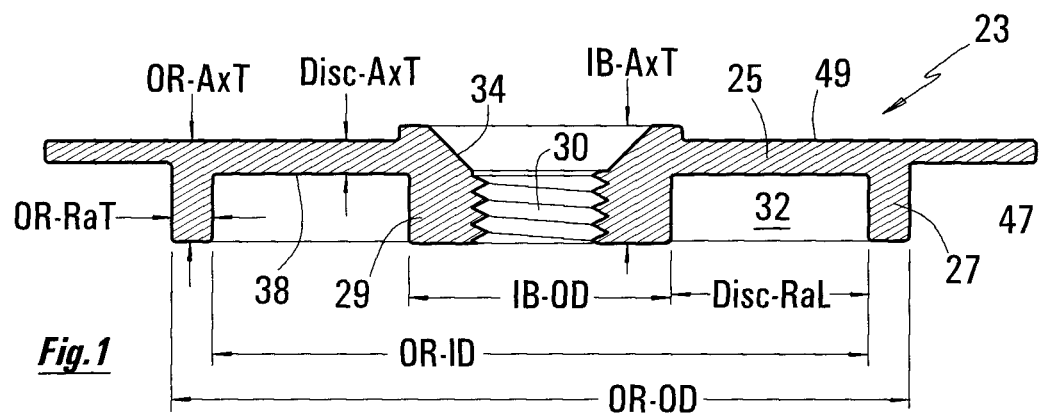
FIG. 1 is a cross-sectioned side elevation of a load-cell.
Figure 2:
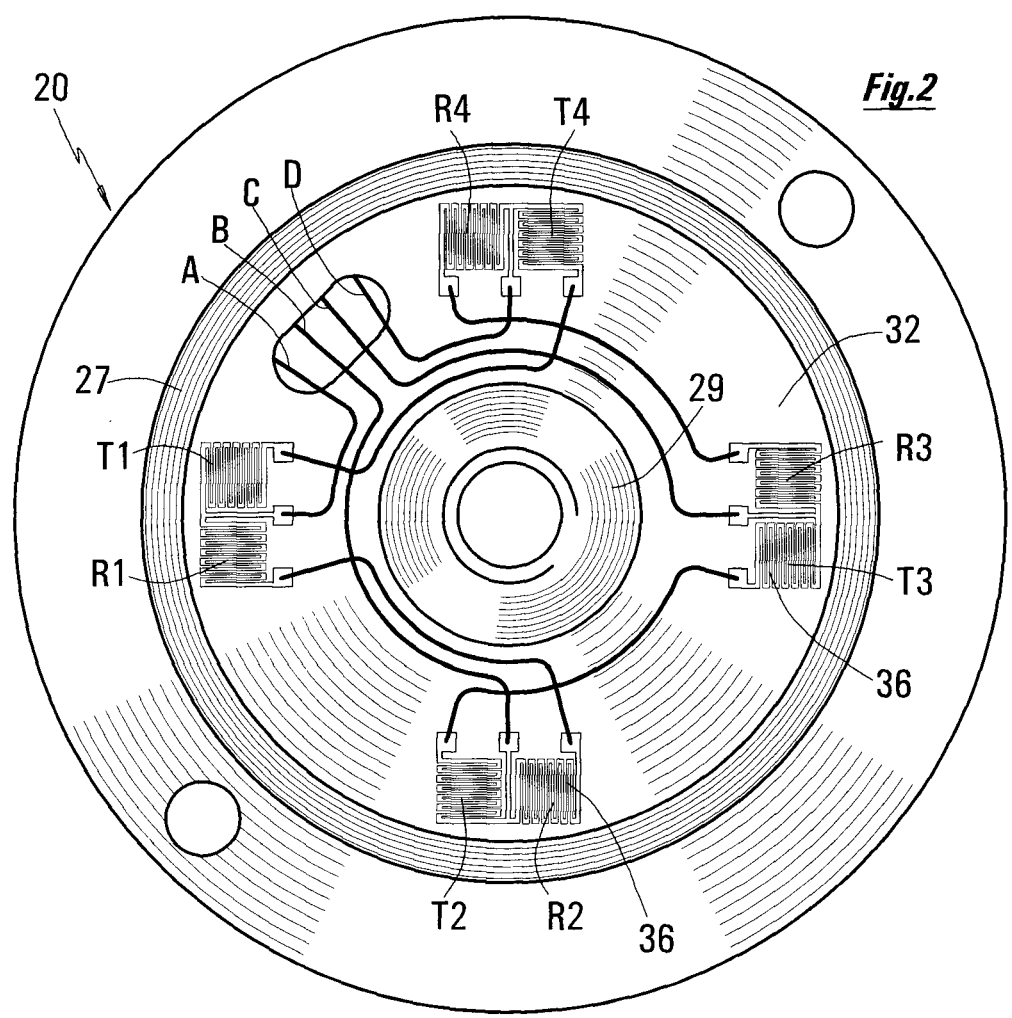
FIG. 2 is a plan view (from underneath) of the load-cell of FIG. 1, including strain-gauges.

In FIGS. 1, 2, the load-cell 20 includes a saucer 23, which is formed from a single piece of metal. The saucer 23 is formed with a thin disc 25 of annular form which extends between an outer-ring 27 and an inner-boss 29.

The outer-ring 27 has an axial thickness OR-AxT (which, in the example, is 6.1 mm) and an inside-diameter OR-ID (38.0 mm). The inner-boss 29 has an axial thickness IB-Axt (8.1 mm) and an outer-diameter IB-OD (12.0 mm).

The inner-boss 29 is formed with a (8 mm) female screw-thread 30, and with a countersunk recess 34.

The downwardly-protruding outer-ring 27 and inner-boss 29 create an annular recess 32 under the disc 25, termed the gauge-recess. This recess provides a protective shield within which the delicate strain-gauges can be housed, with a good degree of physical protection. The strain-gauges 36 are cemented to the undersurface 38 of the disc 25.

The eight strain-gauges 36 are arranged in four pairs, which lie equi-pitched around the undersurface of the disc 25. Each pair includes one strain-gauge T1, T2, T3, T4 that is so oriented as to sense tangential (circumferential, or hoop) strains in the undersurface 38 of the disc 25, while the other strain-gauge R1, R2, R3, R4 of the pair is orientaed to sense radial strains in the undersurface.

Figure 2A:
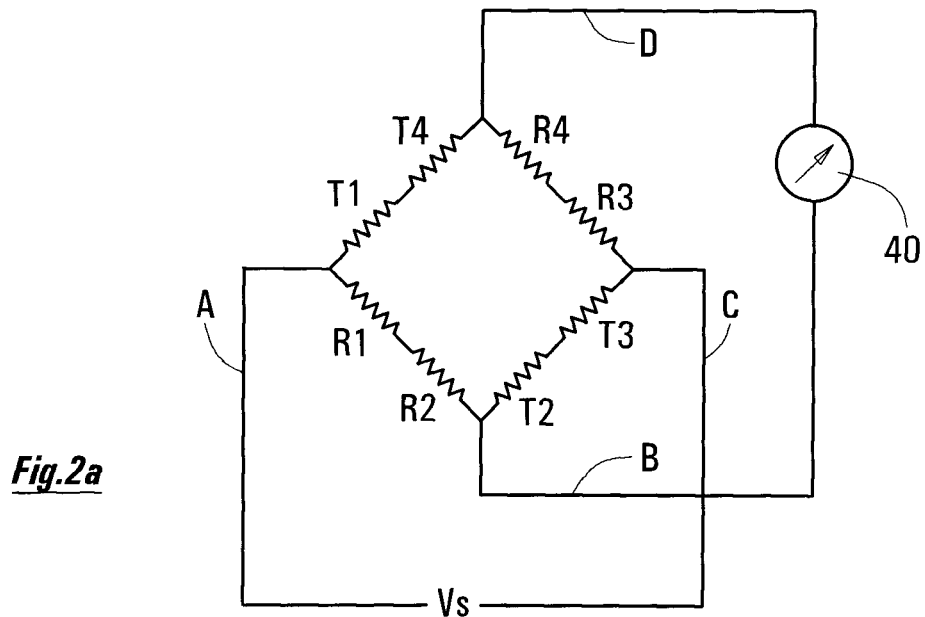
FIG. 2a is a diagram of a bridge circuit, showing the connections of the leads from the strain-gauges.

FIG. 2a shows a Wheatstone-bridge circuit, which illustrates how the eight strain-gauges 36 are connected. Two of the four tangential strain-gauges (T1, T4 in FIGS. 2, 2a) are arranged on one side of the bridge, the other two tangential strain-gauges (T2, T3) being arranged on the opposite side of the bridge. Similarly, two of the four radial strain-gauges are arranged on one intermediate side of the bridge, the other two radial strain-gauges being arranged on the opposite intermediate side of the bridge.

A supply voltage Vs (typically ten volts) is applied between the leads A, C. A voltmeter 40 is connected between the leads B, D, and measures and indicates changes in the resistances of the strain-gauges as the disc 25 deflects under load. An adjustable resistor may be included in the bridge circuit, for the purpose of balancing the bridge and zeroing the bridge to the no-load condition.

Figure 3:
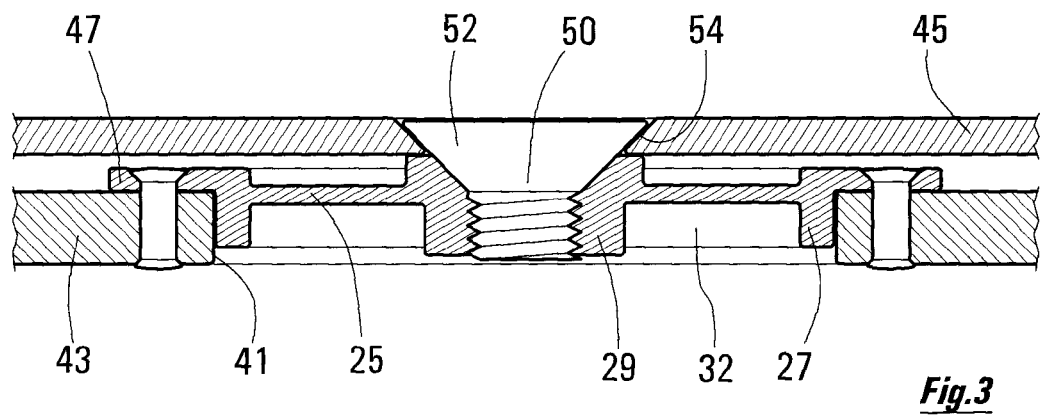
FIG. 3 is a sectioned side-elevation of a load-cell installed to operate to signal loads between a load-plate and a mounting-plate.

In a typical installation, shown in FIG. 3, the load-cell 20 (which includes the eight strain-gauges 36 cemented to the disc 25) is mounted in a mounting-hole 41 cut in a mounting-plate 43. A load-plate 45 is located above the mounting-plate 43. A flange 47 of the saucer is tightly riveted to the mounting-plate 43.

The mounting-hole 41 should be a reasonably close fit (i.e a location-fit) to the outer diameter OR-OD of the outer-ring 27 of the saucer 23. Of course, the hole 41 must be large enough to allow the load-cell to be assembled therein, but if the hole 41 were to be much larger than that, the flange 47 (being, in this example, thinner than the disc 25) might itself undergo some deflection when the load is applied; such deflection, especially if it were uneven circumferentially, might spoil the accuracy of the measurement. From this standpoint, a clearance of more than about one mm would be too much.

Figure 4:
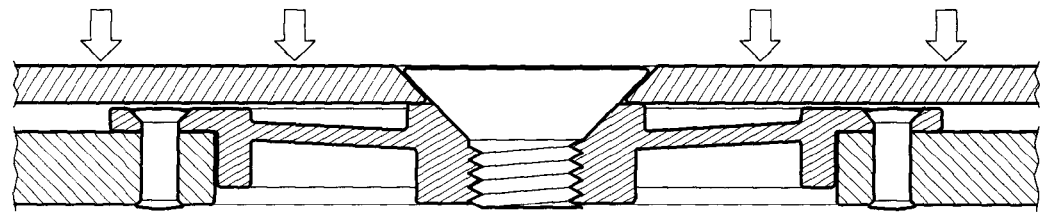
FIG. 4 is the same view as FIG. 3, but shows the load-cell in a state of deflection.

The underside of the load-plate 45 rests on the top face 46 of the inner-boss 29. When a load is applied to the load-plate 45, the load-plate presses down on the inner-boss 29, whereby the disc 25 deflects downwards, as shown in FIG. 4.

Figure 5:
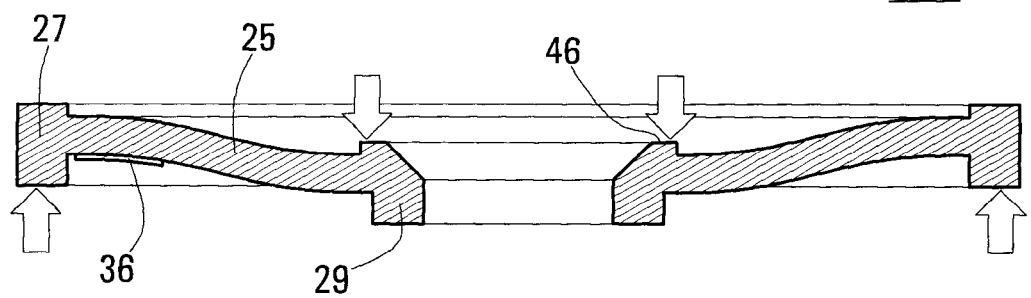
FIG. 5 is a diagram illustrating the manner of the deflection.

FIG. 5 shows the (exaggerated) deflected shape of the disc. The outer-ring 27 and the inner-boss 29 are characterized as "chunky". What this means is that, when the saucer 23 deflects, substantially only the thin disc 25 actually deflects. The outer-ring and the inner-boss are of such size and shape that their deflection under load is substantially zero. That is to say: such deflection as the outer-ring and the inner-boss do undergo is negligible, by comparison with the deflection of the annular disc 25.

The radial thickness OR-RaT of the outer-ring, in the example, is 3 mm, and its axial thickness OR-AxT, as mentioned, is 6.1 mm. The thickness Disc-AxT of the disc 25, in the example, is 1.7 mm. Thus, the stresses (and therefore strains) induced in the saucer 23, by the application of the load on the load-plate 45, are much higher in the disc 25 than in either the outer-ring 27 or the inner-boss 29.

Thus, the chunky outer-ring and inner-boss remain undeflected under an applied load. Of course, during deflection, the inner-boss 29 has moved downwards, in FIG. 4, but its size and shape have not changed. Likewise the diameter and configuration of the outer-ring 27 do not change under an applied load. The disc 25 is constrained, by the rigidities of the outer-ring and inner-boss, to deflect in the mode as illustrated in FIG. 5.

By contrast, if the disc were to be unconstrained by the outer-ring and the inner-boss (e.g if the saucer 23 were replaced by a simple washer), the deflection of the disc would be considerably greater for a given applied load and for a given thickness of the disc. Or, in other words, the disc 25, because it is so heavily constrained by the outer-ring and inner-boss, can be considerably thinner than a simple washer would have to be, for a given magnitude of deflection. This thinness of the disc 25 means that the spring-rate of the disc 25 can be more or less constant over a large range of deflection. One of the problems with conical deflections (of washers, etc) generally is that the deflection can be significantly non-linear. The thinner the disc, the less significant the non-linearity problem.

The desired degree of thinness can be expressed as the ratio of the thickness of the disc to the radial length of the annulus of the disc. In the example, the axial thickness Disc-AxT of the disc, as manufactured, is 1.7 mm. The radial length Disc-RaL of the annulus of the disc is 8.5 mm. The Disc-RaL:Disc-AxT ratio then is 5:1. A lower limit of the ratio would be about 3:1—below that, the disc's spring-rate might be too far from the true-linear. An upper limit would be about 8:1—above that, the deflection of the disc might damage conventional strain-gauges.

Thus, the outer-ring and the inner-boss serve double-duty. They enable the disc to be thin, and they serve to define a protective or shielding gauge-recess in which the fragile strain-gauges can reside.

The radial thickness OR-RaT of the outer-ring 27 in the example is 3.0 mm, the inner-diameter OR-ID of the outer-ring being 37.9 mm—for an OR-ID to OR-RaT ratio of 12.6:1. Preferably, that ratio should not be smaller than about 8:1.

As to axial thickness, the axial thickness OR-AxT of the outer-ring should be about 1.5 times the axial thickness Disc-AxT of the disc. Below that, the deflection of the outer-ring might not be negligible by comparison with the deflection of the disc.

As shown in FIG. 1, the oversurface 49 of the disc 25 is flush with the top of the outer-ring 27. That is to say: the disc 25 is as high as it can be with respect to the height of the outer-ring. This is advantageous from the standpoint of creating a deep (and therefore well-protected) gauge-recess 32. However, the gauge-recess under the disc sometimes can be permitted to be shallower, and yet still provide a very effective shield. In that case, the disc 25 can be partway down the height of the outer-ring—as shown in FIG. 3 etc.

In fact, in a case where it is desirable to provide strain-gauges on both the undersurface 38 and the oversurface 49 of the disc, the designer should prefer to place the disc e.g halfway down the outer-ring, thereby creating effectively-protective gauge-recesses both above and below the disc.

Placing strain-gauges on the oversurface of the disc is, however, less preferred, because inevitably such strain-gauges will be more exposed and vulnerable to being damaged, at least during installation.

The retention screw 50 serves to hold the load-plate 45 in place with respect to the inner-boss 29 of the saucer 23, in such manner that, when a load is applied urging the load-plate and the inner-boss apart, the head or cap 52 of the screw 50 constrains the load-plate and the inner-boss against separation. Preferably, the screw should not hold the load-plate tightly and immovably against the inner-boss, but rather the screw should be loose enough, with respect to the load-plate, to provide some free play between the load-plate and the inner-boss.

The load-plate 45 is provided with a countersunk recess 54, which complements the recess 34 of the inner-boss 29. The designer can arrange for the recess 54 to complement the recess 34 in such manner that the head 52 of the screw 50 can be tightened down into the recess 34 of the inner-boss, but the recess 54 is a little too wide for the head then to be tight on the load-plate 45. Thus, even though the screw is tightened onto the inner-boss, still there is free play between the screw head and the top-plate.

However, the prudent designer might not wish to rely on the installer cutting the countersunk recess 54 to the required degree of accuracy that would allow the screw-head to be tightened to the recess 54. If the installer were to cut the recess 54 a little too small, tightening the screw would clamp the load-plate tightly to the inner-boss. As explained below, that condition should be avoided. The designer might prefer, therefore, to instruct the installers that, having tightened the screw 50, they should then back off the screw e.g a quarter turn. This will ensure that the top-plate is not tight with respect to the inner-boss. The screw should be such that it will not work loose, of course. This can be done by means of a thread-locking system such as thread-lock adhesive.

The function of the retention screw is not to transmit load from the top-plate to the inner-boss of the saucer. Thus, the designers should see to it that the countersunk recesses 34,54 are so sized that the head 52 of the retaining screw never protrudes above the load-plate. The load transmission function is performed by the engagement of the top-plate onto the top 46 of the inner-boss. Rather, the role of the retention screw is to constrain the top-plate to remain with the mounting-plate, i.e not to separate from the mounting-plate, when there is no load resting on the top-plate.

During the application or removal of the load, it is all too easy for the load-plate to be banged or knocked; the function of the retention screw is to ensure that the load-plate does not become displaced, if that should happen. Every time it measures a load, the load-plate should be always in the same location relative to the load-cell housed in the mounting-plate, and in particular the load-plate should always engage the load-cell in the same place and in the same manner. The retaining screws should be loose enough not to feel knocks and impacts felt by the load-plate; yet tight enough to keep the load-plate in a correct load-measuring position.

The manner in which the load-cell can be retro-fitted to an existing truck will now be described.

Figure 6:
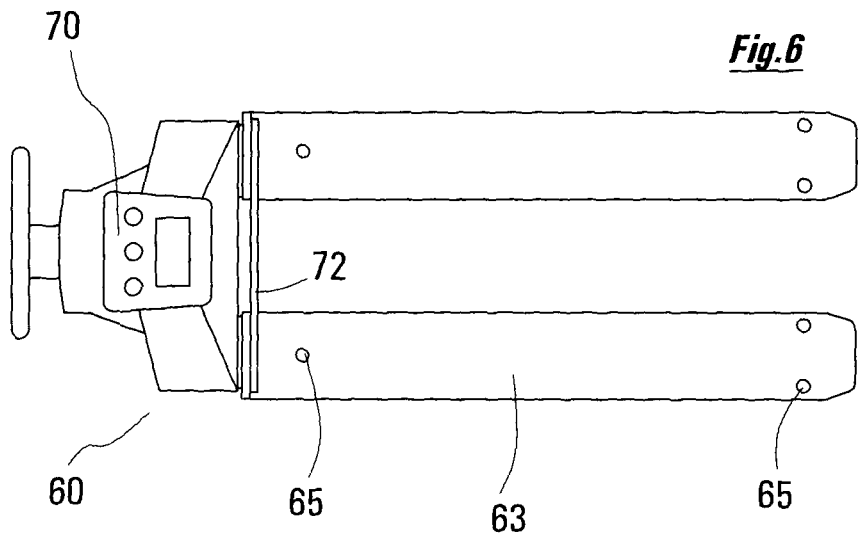
FIG. 6 is a plan view of a pallet truck having a load-measurement system.
Figure 7:
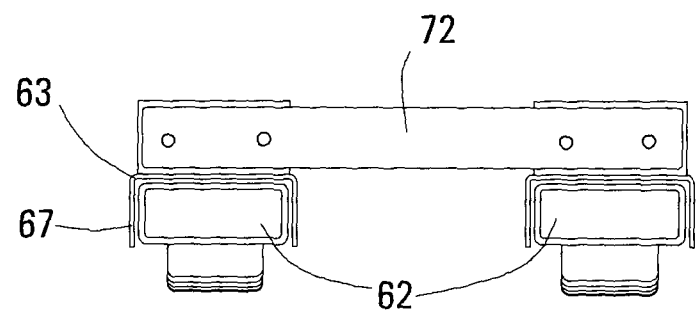
FIG. 7 is a front view (on a larger scale) of a fork portion of the truck of FIG. 8.
Figure 8:
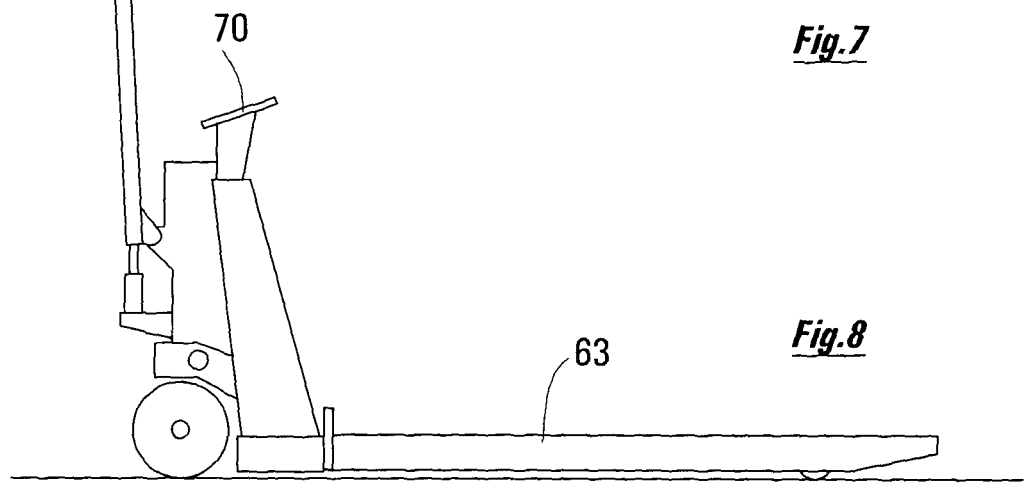
FIG. 8 is a side elevation of the truck of FIG. 8.

FIGS. 6, 7, 8 are a plan view, a front view and a side elevation of a walkie-type of pallet truck 60. The forks of the truck can be raised and lowered by manipulation of the handle; or the truck may have an on-board power-source, drive-motor, etc.

The walkie is designed so that, when the forks are in their down position, the forks can be inserted into the slots of a factory pallet, and then the pallet can be raised, for movement of the pallet, by raising the forks. The forks have to be thin enough, as to their vertical thickness, to fit into the forkspaces of a standard pallet. While the fork itself is no problem, adding fork-covers, load-cells, wiring, and the like, the aggregate height might indeed be a problem. Therefore, it is important to maintain a small vertical profile for the various components that are to be fitted to the fork.

The mounting-plate 43 of the previous drawings can be equated to the fork 62 of the pallet truck 60. The load-plate 45 can be equated to the fork-cover 63 that is a component of the retro-fit load-cell kit.

The fork-cover 63, as supplied in the installation kit, is pre-formed with holes 65 with countersunk recesses. In the example, three such holes are provided per fork-cover 63. The fork-cover is placed over the fork, and the pre-formed holes are used as a template to mark the locations on the fork 62 at which holes are to be made.

It is important that the fork-cover 63 be placed such that the skirts 67 do not touch the sides of the fork 62. If the fork-cover were to contact the fork, during a measurement, the load-cell signal could not be relied upon as a true measure of the load. Not only should the fork-cover be large enough to fit over the fork, but suitably-sized (temporary) spacers should be used, between the skirts 67 and the fork 62, during installation, to ensure that the clearance is the same both sides.

When marking the fork 62 as to the locations of the holes to be made in the fork, the fork-cover 63, used as a template, should be pushed back towards the rear of the truck 60, until the front or toe of the fork 62 contacts a provided abutment in the fork-cover 63. Pallet trucks, in service, continually strike obstructions etc, especially with the front ends of the forks, and it is important that such shocks are transmitted through the abutment, not through the load-cells.

Mounting-holes then drilled in the forks 62, at the marked locations. (These mounting-holes correspond to the mounting-hole 41 in FIG. 3.) Each mounting-hole is made large enough to receive the outer-diameters OR-OD of the load-cells. The load-cell is secured to the fork, and the fork-cover is (loosely) secured to the load-cell using the countersunk retaining screw 50, e.g in the manner as shown in FIG. 3.

The lead wires from the installed load-cells are connected to a display-unit 70, which is mounted on the truck 60, and to an appropriate power source. The leads should be protected physically, which can be done e.g by taping the wires to the fork 62, running them underneath the fork-cover 63.

As shown, three load-cells are provided per fork 62 (i.e per fork-cover 63). However, the number could be e.g two per fork. The fork-covers are not very stable on the forks, even with three or even four load-cells per fork, for which reason a crossbar 72 may be provided. The crossbar 72 ties the left and right fork-covers 63 together, thereby preventing them from tipping.

Figure 9:
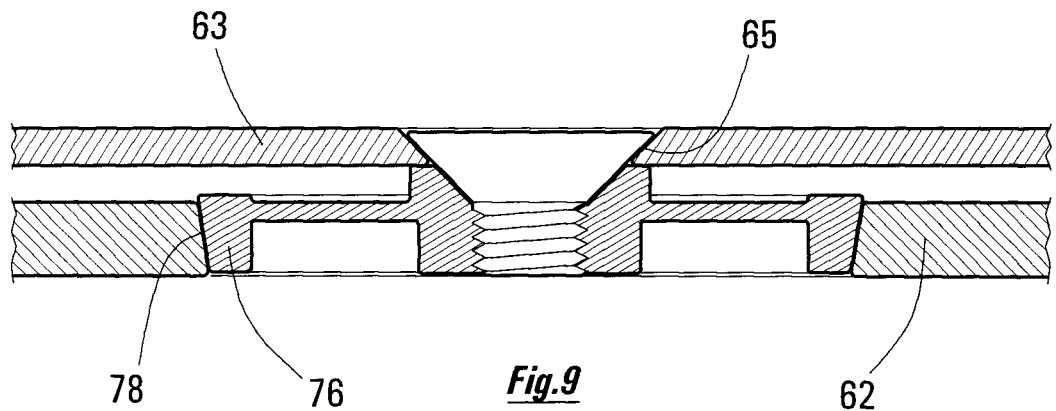
FIG. 9 is a sectioned side elevation of another installed load-cell.
Figure 10:
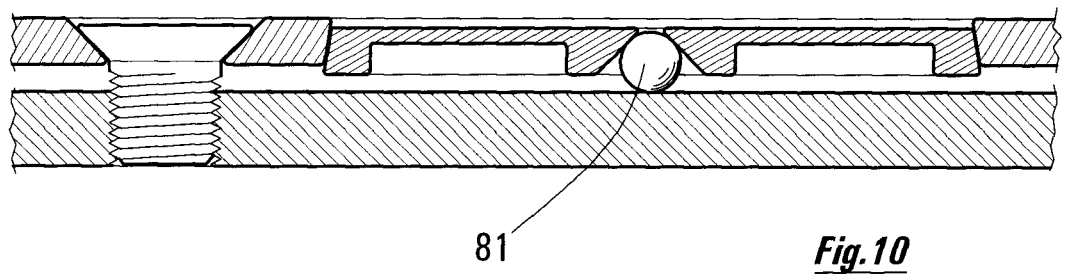
FIG. 10 is a sectioned side elevation of yet another installed load-cell.

FIGS. 9, 10 show some variants as to the structure of the load-cell, and its manner of installation.

In FIG. 9, there is no mounting flange 47; rather, the outer-ring 76 of the saucer is formed with a conical outer surface, which fits in a complementarily-conical socket 78 formed in the mounting-plate. As mentioned, one of the key design desiderata is that the load-cell should have a very low vertical height. The removal of the flange 47 (and the associated rivets) is aimed at minimizing the vertical height that the designer needs to provide between the mounting-plate and the load-plate.

Of course, a conical or tapered socket is more difficult to form—and it is more difficult to ensure that it has been formed correctly—than is the case when the hole in the mounting-plate is simply cylindrical. However, a tapered reamer, with a collar to ensure the correct depth of the taper in the mounting-plate, can be included as a component of a special tool-kit that accompanies the kit of components, and, with its aid, a correctly tapered hole or socket 78 can be made by a reasonably skilled technician.

If the engagement between the load-cell and the mounting-plate is designed as a self-locking taper (e.g when the cone has an included angle less than about ten degrees), there is no need for further components to hold the load-cell in place.

FIG. 10 shows the load-cell in an inverted orientation. In FIG. 10, the mounting-plate (in which the load-cell is mounted) is the fork-cover 63, and the load-plate is the fork 62. In FIG. 10, again the saucer is attached to the mounting-plate using a tapered socket, again preferably of the self-locking type. In FIG. 10, the load is applied to the inner-boss through a ball 81, and the disc of the saucer deflects upwards when a load is applied to the fork-cover. In FIG. 10, it can be difficult for the designer to place the retention screw through the inner-boss, as in the previous load-cells, so in FIG. 10 the retaining screw is separated from the load-cell, and placed alongside.

One of the benefits of the FIG. 10 inversion is that the tapered socket can be formed in the fork-cover on an in-factory basis, whereby the accuracy of the socket can be more easily controlled than when the socket is formed by the installation technician. The only modification that need be done to the fork itself is to form the screw-tapped hole for the retaining screw. Again, the retaining screw should be slightly loose. The fork-cover should rest only on the balls of the load-cells, and not on the screws—and in fact on nothing else but the balls 81.

The indicia used in the drawings can be summarized as follows.

20 load-cell
23 saucer
25 thin annular disc
27 outer-ring
29 inner-boss
30 screw-thread
32 annular gauge-recess
34 countersunk recess in 29
36 strain-gauges
38 undersurface of 25
40 voltmeter
41 top-face of 29
43 mounting-plate
45 load-plate
46 load-cell mounting-hole in 43
47 flange of 23
49 oversurface of 25
50 retention screw
52 screw head
54 countersuck recess in 45
60 walkie truck
62 fork of 60
63 fork-cover
65 holes in 63
67 skirt of 63
70 display unit
72 crossbar
76 outer-ring of saucer (FIG. 9)
78 conical or tapered socket in mounting-plate
81 ball (FIG. 10)
OR-AxT axial thickness of outer-ring
OR-ID inner diameter of outer-ring
OR-OD outer diameter of outer-ring
OR-RaT radial thickness of outer-ring
Disc-AxT axial thickness of disc
Disc-RAL radial length of disc IB-AxT axial thickness of inner-boss
IB-OD outer diameter of inner-boss
R1, R2, R3, R4 radial strain-gauges
T1, T2, T3, T4 tangential strain-gauges
A, B, C, D connecting leads Terms of orientation, such as "above", down", "left", and the like, when used herein are intended to be construed as follows. When the terms are applied to an apparatus, that apparatus is distinguished by the terms of orientation only if there is not one single orientation into which the apparatus, or an image of the apparatus, could be placed, in which the terms could be applied consistently.

The scope of the patent protection sought herein is defined by the accompanying claims. The apparatuses and procedures shown in the accompanying drawings and described herein are examples.

The invention claimed is:

1. Load-cell for signaling the magnitude of a force, wherein:
    the load-cell includes a saucer;
    the saucer includes a chunky outer-ring;
    the saucer includes a thin disc, which extends radially inwards from the outer-ring;
    the arrangement of the load-cell is such that when an axial load is applied to the disc, the load-cell being supported at its outer-ring, the disc deflects in a conical deflection mode;
    the disc has an oversurface and an undersurface;
    the outer-ring projects axially, beyond the undersurface of the disc, whereby the saucer defines and includes an annular recess under the disc, inside the outer-ring, termed the gauge-recess;
    the load-cell includes a plurality of strain-gauges;
    the strain-gauges are located on the undersurface of the disc, and within the gauge-recess;
    the strain-gauges are secured to the undersurface of the disc in such manner as to sense strains induced in the disc due to conical deflection of the disc;
    the load-cell includes a conductor, for conducting signals indicating the sensed strains to a receiver;
    the load-cell includes a fixing-flange, which extends radially outwards from the outer-ring.

2. As in claim 1, wherein:
    the outer-ring has an axial thickness OR-AxT;
    the disc has an axial thickness Disc-AxT;
    over at least a major portion of the disc, its thickness Disc-AxT is substantially less than the thickness OR-AxT of the outer-ring.

3. As in claim 2, wherein:
    the outer-ring has an inner diameter OR-ID;
    the disc extends inwards from the outer-ring;
    OR-AxT is about 1.5 times Disc-AxT, or more;
    the thickness Disc-AxT obtains over a radial length Disc-RaL of the disc, where:
    (a) Disc-RaL extends radially inwards from the inner-diameter OR-ID of the outer-ring; and
    (b) Disc-RaL is about one-fifth, or more, of the inner diameter OR-ID of the ring.

4. As in claim 1, wherein:
    the disc is formed with a through-aperture; and
    electrical leads from the strain-gauges secured to the undersurface of the disc pass through the through-aperture.

5. As in claim 1, wherein:
    two of the strain-gauges are arranged to form a closely-adjacent pair;
    one strain-gauge of the pair is arranged to sense tangential or circumferential strains in the undersurface of the disc, and
    the other strain-gauge of the pair is arranged to sense radial strains in the undersurface of the disc.

6. As in claim 5, wherein:
    the load-cell includes four such pairs of strain-gauges;
    the four pairs are located on the undersurface of the disc, close to the outer-ring;
    the four pairs lie equi-pitched around the undersurface of the disc;
    two of the four tangential strain-gauges are arranged on one side of a Wheatstone bridge, the other two tangential strain-gauges being arranged on the opposite side of the bridge; and
    two of the four radial strain-gauges are arranged on one intermediate side of the bridge, the other two radial strain-gauges being arranged on the opposite intermediate side of the bridge.

7. As in claim 1, wherein:
    the saucer includes a chunky inner-boss;
    the thin disc extends annularly between the outer-ring and the inner-boss;
    the arrangement of the load-cell is such that when an axial load is applied to the inner-boss, the load-cell being supported at its outer-ring, the disc deflects in a conical deflection mode;
    the outer-ring and the inner-boss both project downwards, beyond the undersurface of the disc;
    the gauge-recess under the disc lies between the inner-boss and the outer-ring.

8. As in claim 7, wherein:
    the inner-boss has an axial thickness IB-AxT;
    over at least a major portion of the disc, its thickness Disc-AxT is substantially less than the thickness IB-AxT;
    preferably, IB-AxT is about 1.5 times Disc-AxT, or more.

9. As in claim 8, wherein:
    the thickness Disc-AxT of the disc obtains over a radial length D-RaL of the annular form of the disc;
    where Disc-RaL extends radially from the inner-diameter OR-ID of the outer-ring OR to the outer diameter IB-OD of the inner-boss; and
    Disc-RaL is about one-fifth, or more, of the inner diameter OR-ID of the outer-ring.

10. As in claim 7, wherein the inner-boss, the outer-ring, the disc, and the flange, of the load-cell are formed from a single unitary piece of metal.

11. Combination of a load-cell that embodies every word of claim 7 with a mounting-plate, a load-plate and a threaded fastener, wherein:
    the outer-ring of the saucer is tightly fixed into a mounting-hole in the mounting-plate;
    the fastener is screw-threaded to the inner-boss of the load-cell;
    the fastener passes through a fastener-hole in the load-plate;
    a head of the fastener holds the load-plate against the inner-boss of the load-cell, in such manner that, when a load is applied urging the load-plate and the inner-boss apart, the fastener constrains the load-plate and the inner-boss against separation;
    the fastener does not hold the load-plate tightly and immovably against the inner-boss, but rather the fastener is loose enough, with respect to the load-plate, to enable some free play between the load-plate and the inner-boss.

12. Combination of a load-cell that embodies every word of claim 1 with a mounting-plate and a load-plate, wherein:
- the mounting-plate is integral with a fork of a forklift truck;
- the load-plate comprises a fork-cover, which is arranged to overlie the fork, in such manner that a load to be lifted by the fork rests, not directly on the fork, but on the fork-cover;
- the arrangement of the combination is such that the weight of a load resting on the fork-cover is transmitted down to the fork through the load-cell.

13. Combination of a load-cell that embodies every word of claim 1 with a mounting-plate and a load-plate, wherein:
- the load-plate is integral with a fork of a forklift truck;
- the mounting-plate comprises a fork-cover, which is arranged to overlie the fork, in such manner that a load to be lifted by the fork rests, not directly on the fork, but on the fork-cover;
- the arrangement of the combination is such that the weight of a load resting on the fork-cover is transmitted down to the fork through the load-cell.

14. Kit of components for adding a load-measurement system to a pallet truck having forks, including:
- a pair of fork-covers, for fitting over the forks of the pallet truck;
- the fork-covers are prepared with through-holes formed therein:
- temporary spacers, for placement between the forks and the fork-covers, of such structure as to promote even placement of the fork-covers on the forks;
- a number N of load-cells;
- a display unit, and associated electrical components for receiving signals from the N load-cells, and for displaying loads as measured by the load-cells; and
- each of the N load-cells is a load-cell that embodies every word of claim 1.

15. Procedure for adding a load-measurement system to a pallet truck, including:
- providing a kit that embodies every word of claim 14;
- placing the fork-covers over the forks of the truck;
- using the fork-cover and the through-holes therein as a template, for marking out the location of mounting-holes on the upper surface of the fork;
- removing the fork-cover, and forming mounting-holes in the fork for receiving the load-cells;
- attaching the load-cells into the mounting-holes of the forks, and attaching the fork-covers to the forks in such manner as to leave some free play between the fork-covers and the forks; and
- connecting wire leads from the load-cells to the display unit, in such manner that the unit is effective, in operation, to display the magnitude of a load resting on the fork-covers, as measured by the load-cells.

16. As in claim 1, wherein the fixing-flange has an axial thickness that is substantially less than the axial thickness of the thin disc.

17. Combination of a load-cell that embodies every word of claim 1 with a mounting-plate, wherein:
- the mounting-plate is formed with a mounting-hole;
- the outer-ring has a radially-outwards-facing surface;
- the radially-outwards-facing surface of the outer-ring is a location-fit in the mounting-hole;
- the outer-ring is inserted into the mounting-hole; and
- the fixing-flange is in contact with the mounting-plate.

* * * * *